United States Patent [19]

Gachot et al.

[11] 3,850,458

[45] Nov. 26, 1974

[54] LEAK-TIGHT CONNECTOR FOR HYDRAULIC OR PNEUMATIC INTEGRATED CIRCUIT MODULE

[76] Inventors: Jean Gachot, 26, avenue de Paris, Soisy Sous Montmorency, Val d'Oise; Simeon Lekarski, 138 boulevard de la Republique, Saint Cloud, Hauts de Seine, both of France

[22] Filed: Apr. 12, 1973

[21] Appl. No.: 350,528

[30] Foreign Application Priority Data

Apr. 28, 1972 France .............................. 72.15188

[52] U.S. Cl. ............. 285/137 R, 137/594, 285/305, 285/319, 285/423, 285/DIG. 22
[51] Int. Cl. ............................................. F16l 39/00
[58] Field of Search .... 137/608, 594, 561 R, 561 A; 285/DIG. 22, 137 R, 305, 364, 365, 124, 125, 126, 319, 423, 320, 157

[56] References Cited
UNITED STATES PATENTS

| | | | |
|---|---|---|---|
| 228,883 | 6/1880 | Freeman ........................ | 285/320 X |
| 3,465,772 | 9/1969 | Monge et al. .................. | 137/608 X |
| 3,513,876 | 5/1970 | Tarbox .......................... | 137/608 X |
| 3,516,436 | 6/1970 | Klaus et al. .................... | 137/561 R |
| 3,516,442 | 6/1970 | Munroe ......................... | 285/334.4 X |
| 3,677,577 | 7/1972 | Krauer .......................... | 285/137 R |
| 3,707,989 | 1/1973 | Jullien-Davin ................. | 137/608 |

*Primary Examiner*—Jordan Franklin
*Assistant Examiner*—Moshe I. Cohen
*Attorney, Agent, or Firm*—Young & Thompson

[57] ABSTRACT

A connector providing a leak-tight coupling between external tube elements and a module containing fluid circuits having openings located at intervals on at least one face of the module. The connector consists of an elastic base which forms a housing delimited by at least one elastically deformable side section for accommodating that portion of the module in which the openings are located. The base is pierced by ducts spaced at intervals corresponding to the spacing of the module openings, one end of each duct being provided with an opening on the internal face of the deformable side section and the other end being adapted to receive an external tube element. Clamping means are provided for locking the module within its housing and applying the deformable side section in leak-tight manner against that face of the module on which the openings are located.

4 Claims, 5 Drawing Figures

LEAK-TIGHT CONNECTOR FOR HYDRAULIC OR PNEUMATIC INTEGRATED CIRCUIT MODULE

This invention relates to a sealing connector for a module consisting of integrated fluid-circuits of the hydraulic or pneumatic type.

The development of relay or computing systems based on integrated fluid-circuits has entailed the need for special connecting means for these components which are usually designed in the form of small blocks or modules and are intended to be connected to supply and operating tubes. In the majority of instances, these tubes are of flexible plastic material and are a few millimeters in diameter.

Couplings employed for this purpose are already known in which the ends of the tubes are fitted by elastic engagement over grooved nipples or attached by a number of other clamping means. Intermediate couplings or connections of this type are fairly complicated, cumbersome, delicate, costly and inconvenient to use, especially for the replacement of modules.

The object of the invention is to overcome these disadvantages by making provision for a connector which is simple, economical, durable and easy to use.

In accordance with the invention, the leak-tight connector between external tube elements and a module consisting of hydraulic or pneumatic integrated fluid-circuits having openings which are spaced at intervals on at least one face of said module is distinguished by the fact that it comprises an elastic base which forms a housing delimited by at least one elastically deformable side section so as to accommodate that portion of the module in which the openings aforesaid are located, said base being pierced by ducts spaced at intervals corresponding to the spacing of the module openings, one end of each duct aforesaid being provided with an opening on the internal face of the deformable side section and the other end being adapted to receive an external tube element, and clamping means being further provided for locking the module within its housing and applying the deformable side section in leak-tight manner against that face of said module on which said openings are located.

The elasticity of the connector permits leak-tight contact of its side section against that face of the module on which the fluid-circuits to be connected have their openings. The ducts of the module which correspond to the different openings of said circuits are also connected to the supply and operation tube elements, the ends of which are inserted and maintained by elasticity within each opening of the connector base.

Further properties and advantages of the invention will be clearly brought out by the following description of one embodiment which is considered by way of example and not in any limiting sense, reference being made to the accompanying drawings, wherein.

Figure 1:
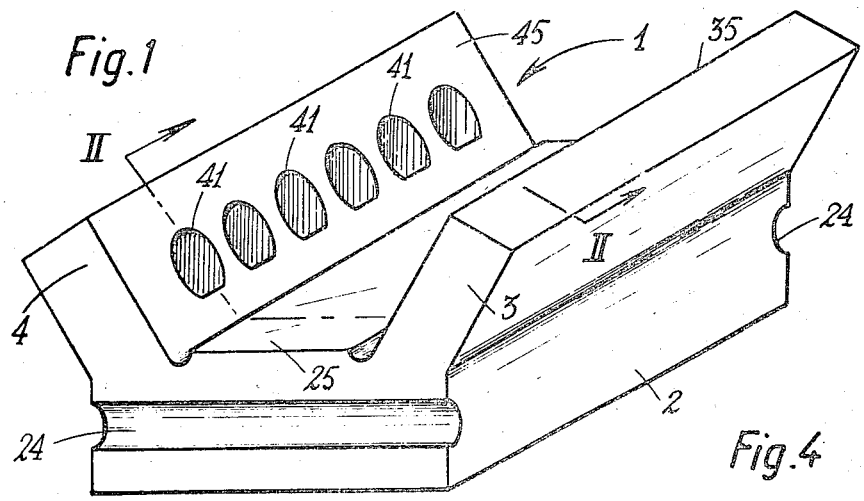
FIG. 1 is a view in perspective of the base of a connector in accordance with the invention.
Figure 2:
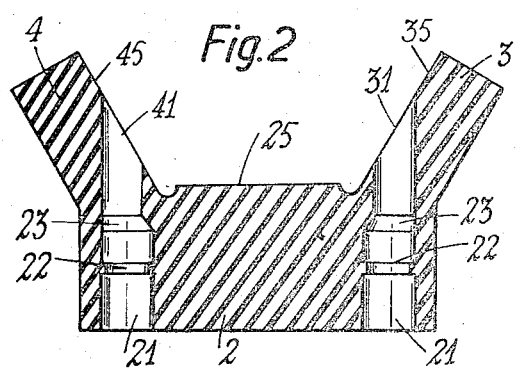
FIG. 2 is a sectional view taken along line II—II of FIG. 1.

The connector 1 which is illustrated in FIGS. 1 and 2 comprises a base 2 of moulded synthetic rubber or of any similar material which is endowed with good elasticity. The base 2 is of substantially parallelepipedal shape and has two rectilinear side sections 3, 4 which are separated by a flat face 25 and disposed in the direction of the long sides of the base 2, two parallel grooves 24 being additionally formed along the small sides of said base.

The base 2 and the side sections 3, 4 of the connector 1 are pierced by ducts 21 which are substantially parallel to each other and perpendicular to the face 25 of the base. The ducts 21 terminate in openings 31, 41 on those faces 35 and 45 of the side sections 3, 4 which are adjacent to the face 25. The ducts 21 are each provided near the opposite ends thereof with an annular projection 22 followed by a necked portion 23 (as shown in FIG. 2).

Figure 4:
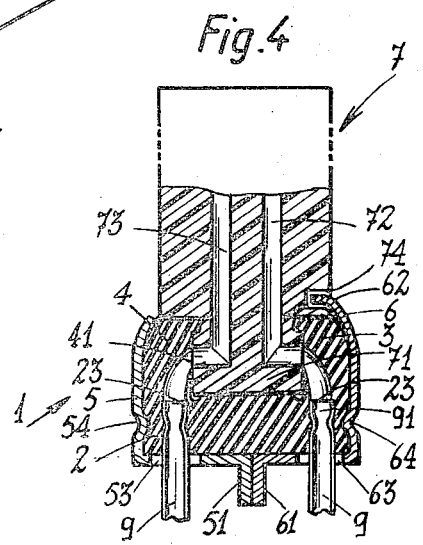
FIG. 4 is a part-sectional view taken along line IV—IV of the connector of FIG. 3.
Figure 3:
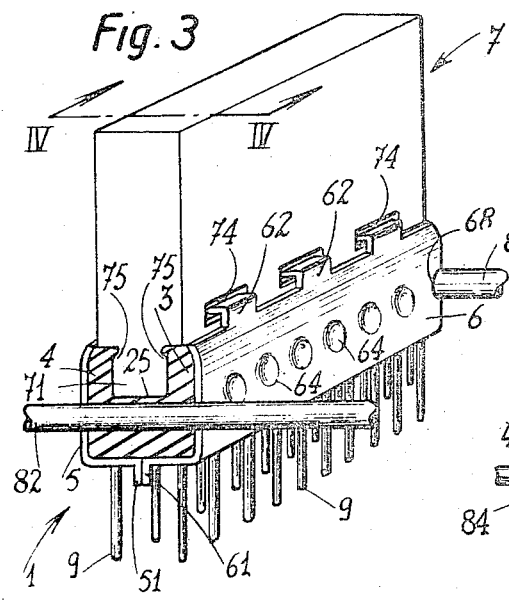
FIG. 3 is a view in perspective of a connector in accordance with the invention and comprising the base of FIG. 1 which is mounted on a block or module consisting of integrated circuits.

The integrated-circuit module 7 which is shown in FIGS. 3 and 4 and for which the connector 1 is intended comprises a substantially parallelepipedal body having a connecting tenon 71, the openings of the integrated circuit ducts 72, 73 being located on both faces of said tenon. The openings 31, 41 of the two side sections 3, 4 of the connector (as shown in FIGS. 1 and 2) are so arranged as to correspond to said openings of the ducts 72, 73 of the module 7. The connecting tenon 71 has a bearing face which is adapted to correspond to the face 25 of the connector.

The resilient side sections 3, 4 of the connector are adapted to correspond to the lateral faces of the connecting tenon 71 of the module 7. By virtue of their elasticity, said side sections are permitted to bear in leak-tight manner on said lateral faces under the action of external pressure-application means. The inner lips of the side sections 3 and 4 can be inserted into longitudinal grooves 75 which are formed in the module 7 (as shown in FIGS. 3 and 4).

The openings 31 and 41 of the connector 1 are intended to be brought in register with the openings of the internal ducts 72, 73 of the module 7 when the resilient side sections 3, 4 of the connector 1 are applied against said module 7 as has been mentioned in the foregoing (FIGS. 3 and 4).

Sectional metallic strips 5, 6 serve to maintain the resilient side sections 3, 4 of the connector 1 applied against the module 7. Said supporting strips 5, 6 have the same length as the long sides of the base 2 of the connector 1 and substantially the same height. The supporting strips are provided with lateral recesses such as 68 (as shown in FIG. 3) which correspond to the grooves 24 of the base 2 and are provided for the insertion of two clamping rods 81, 82.

The supporting strips 5, 6 are provided with inwardly projecting bosses 54, 64 corresponding to the annular projections 22 of the ducts 21 of the connector 1. The flanges 51, 61 are adapted to be applied against each other (as shown in FIGS. 3 and 4) in order to regulate the clamping pressure applied on the resilient side sections 3, 4 of the connector 1 in accordance with a cross-sectional shape which is determined by the shape of the sectional strips. Said strips are also provided in the proximity of the flanges 51, 61 with holes 53, 63 corresponding to the openings of the connector ducts 21 for the insertion of the external tube elements 9.

The supporting strip 6, on its edge remote from the flange 61, is provided with positioning lugs 62, corresponding to slots 74 which are formed in the module 7 in only one of its longitudinal faces, in order to lock said module in position. As shown in FIG. 4, the supporting strip 5 is different, having no positioning lugs as 62, in order to avoid a false position when installing module 7 within the connector.

The assembly and use of the connector 1 can readily be understood from the foregoing description.

When the tenon 71 of the module 7 is applied against the face 25 of the connector, accurate positioning of said tenon is ensured by virtue of the identical dimensions of these two portions.

By applying the resilient side sections 3, 4 of the connector against the connecting tenon 71 of the module 7, the openings 31, 41 of the connector ducts 21 are caused to coincide exactly with the openings of the ducts 72, 73 of the module.

The resilient side sections 3, 4 are applied and held in position by the supporting strips 5, 6. The lips of the resilient side sections 3, 4 penetrate into the grooves 75 of the module 7 (as shown in FIG. 3) and secure this latter with respect to the connector 1.

The positioning lugs 62 of the supporting strip 6 penetrate into the slots 74 of the module 7 and lock this latter in position.

Figure 5:
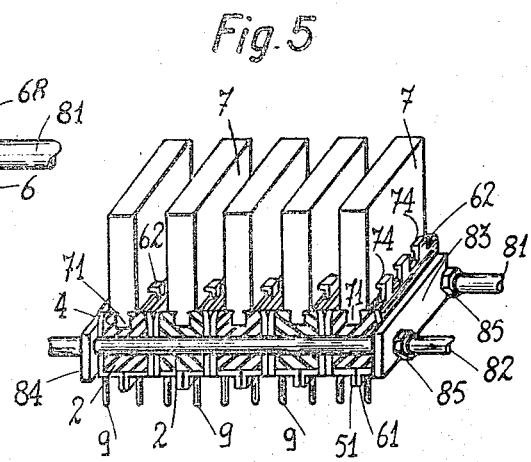
FIG. 5 is a view in perspective showing a bank of connectors mounted on two clamping rods, each element of the bank being similar to the connector shown in FIG. 3.

As shown in FIGS. 3, 4 and 5, the supporting strips 5, 6 on each connector 1 are abuttingly applied against each other at their lower edges 51, 61. On one side of each connector 1, positioning lugs 62 of strip 6 serve to ensure an accurate positioning of each module 7, with respect to each associated connector 1. However, since each other strip 5 has no such positioning lug as 62, as clearly shown in FIG. 4, the accurate positioning of each module 7 is combined with elastic clamping between flexible sides 3, 4 of the connector. This provides noiseless resistance to vibrations, and also permits the immediate removal and re-installation of each module 7 in a rack (FIG. 7), without altering the pressure of the clamping system.

The module 7 which is mounted on its connector 1, together with the two supporting strips 5, 6, is attached for instance to a supporting structure such as a cabinet containing the computing system, by means of two parallel rods 81, 82 (shown in FIG. 3) which are engaged within the recesses 68 of the supporting strips and within the grooves 24 of the base 2 (shown in FIG. 1). The complete assembly is held in position by means of cross-members 83, 84 and nuts 85 (as shown in FIG. 5). In actual conditions of use, an assembled module 7, 1, 5, 6 is practically never employed alone but is associated with other modules of the same type and mounted together with these latter to form a bank.

Each module 7 is connected to the supply and operation tubes 9 simply by inserting the ends of these flexible tubes into each opening of the ducts 21 of the connectors 1 (as shown in FIG. 2) through the holes 53, 63 of the supporting strips (FIG. 4) up to the necked portion 23. The elasticity of the rubber of the base 2 is sufficient to hold the extremities of the tubes 9 in position in a leak-tight manner, said extremities being each compressed by the annular projection 22 under the action produced by the boss 64.

The device which has just been described permits the very convenient replacement of each module 7 as requirements dictate, especially for servicing operations. Each module 7 can be removed separately from its connector (see FIG. 5) by displacing the module transversely on the lugs 62 in a hinge motion in order to release the tenon 71 from the elastic lip 4 since the supporting strip 5 is not provided with positioning lugs. Replacement is immediate by virtue of the elasticity of the lips, 3, 4. The slots 74 have a profile which ensures accurate snap-on engagement over the lugs 62 which corresponds to the engagement of the lips 3, 4 within the grooves 75. The internal coincidence of the openings 31, 41 with the openings of the module ducts 72, 73 is ensured by bringing the lateral faces of the module 7 level with the ends of the supporting strips 5, 6 which have the same length.

By providing the supporting strip 6 alone with positioning lugs 62 which correspond to the slots 74 formed on only one face of the module 7, it is accordingly impossible to mount said module in reverse.

In another advantageous embodiment of the invention (not illustrated), the supporting strips 5 and 6 are each provided with positioning lugs which are similar to the lugs 62 of FIGS. 3 and 4. Said lugs which correspond to slots such as 74 in each longitudinal face of the module 7 are nevertheless designed differently in regard to shape, number or position.

It is thus possible to improve the mechanical strength of the module 7 on its connector 1 while retaining the possibility of controlling the precise position in the transverse direction without any attendant danger of mounting in reverse.

The invention is clearly not limited to the embodiment which has just been described by way of non-limitative example and can be extended to many alternative forms of this latter without thereby departing either from the scope or the spirit of the invention.

What we claim is:

1. In a leak-tight connector for linking external tube elements with a module comprising integrated fluid-circuits, said module having openings which are spaced at intervals on at least one face of said module, said connector comprising a base means which forms a housing that accomodates that portion of the module in which said openings are located, said base means being pierced by ducts spaced at intervals corresponding to the spacing of the openings in the module, the outside end of each said duct in the base means being open to receive the end of an external tube element, clamping means for locking the module within the housing and applying the base means in a leak-tight manner to each face of the module on which said openings are located; the improvement wherein said housing is delimited by two elastically deformable and opposite side sections having openings for the said ducts of the base means, and said clamping means being applied to said side sections and pressing them in a leak-tight manner against two opposite faces of the module.

2. A connector according to claim 1, having clamping means with opposite supporting strips applied to the opposite side sections of the base means, wherein the supporting strips have bosses projecting towards said side sections, and placed at the level of each duct which extends through the base means in order to lock the end of the external tube element in position.

3. A connector according to claim 2, wherein said supporting strips have at least one opening therein at each side of said base means leaving an exposed portion of the base means, those faces of the base means which are left exposed by the supporting strips each having a groove, and a clamping tie-rod extending through said groove and said openings in the supporting strips.

4. A connector according to claim 3, wherein said connector is associated with a series of similar connectors held in position by two clamping tie-rods which are fitted within the aligned grooves of the different connectors.

* * * * *